United States Patent

[11] 3,589,319

| [72] | Inventor | Gerald L. Peters<br>2208 Shadecrest Road S.E., Huntsville, Ala. 35801 |
|---|---|---|
| [21] | Appl. No. | 760,950 |
| [22] | Filed | Sept. 19, 1968 |
| [45] | Patented | June 29, 1971 |

[54] SOIL TREATING MACHINE
7 Claims, 6 Drawing Figs.

[52] U.S. Cl. ........................................................ 111/2,
    172/22
[51] Int. Cl. ........................................................ A01c 5/04,
    A01c 11/00, A01b 45/04
[50] Field of Search ........................................... 111/1, 2, 3,
    89—91; 172/19, 22, 21

[56] References Cited
UNITED STATES PATENTS

| 2,700,926 | 2/1955 | Goit | 172/22 |
| 2,768,570 | 10/1956 | Strid | 172/22 X |
| 3,175,524 | 3/1965 | Kappelmann | 111/3 X |
| 3,306,239 | 2/1967 | Martin, Jr. | 111/1 |

FOREIGN PATENTS

| 568,714 | 1/1933 | Germany | 111/2 |
| 45,369 | 2/1932 | Denmark | 111/3 |

Primary Examiner—Robert E. Bagwill
Attorney—C. A. Phillips

ABSTRACT: A soil treating machine having a forward positioned coring wheel member for removing cores of sod and an after positioned sod planting wheel member for implanting cores of sod in voids created by the coring wheel member.

PATENTED JUN29 1971

INVENTOR.
GERALD L. PETERS.

BY

C.A. Phillips
ATTORNEY.

INVENTOR.
GERALD L. PETERS.

BY

C.A. Phillips
ATTORNEY.

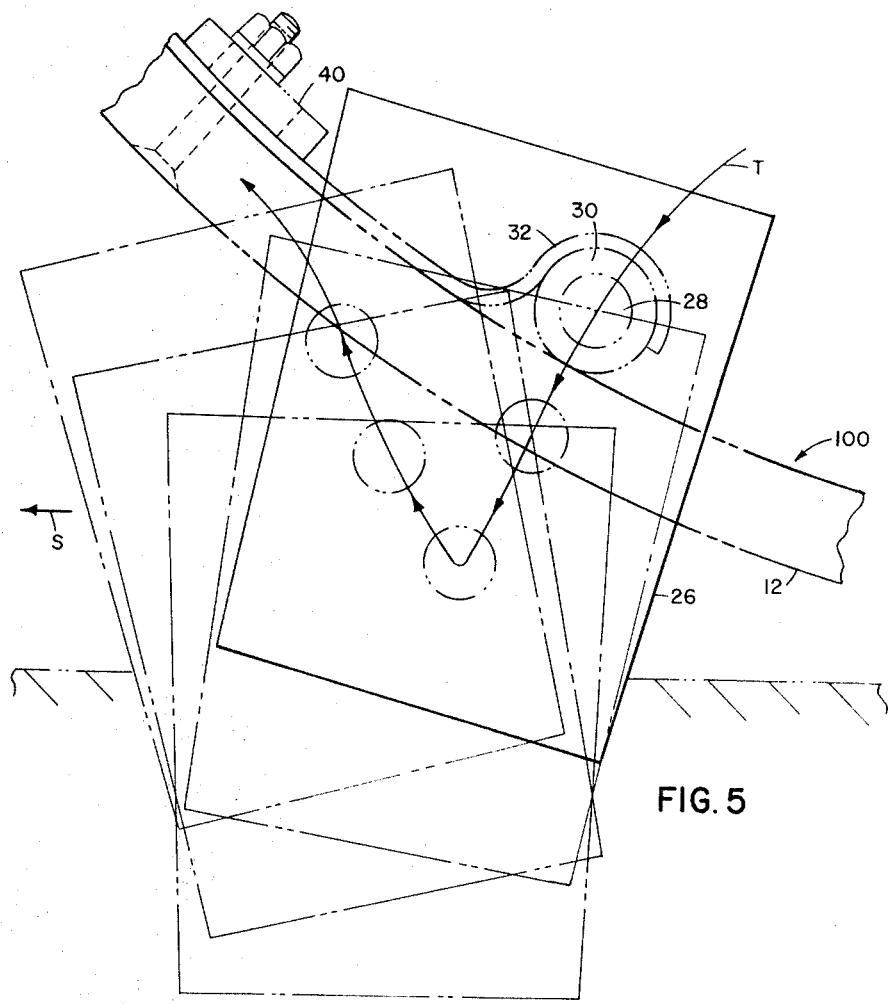
FIG. 5
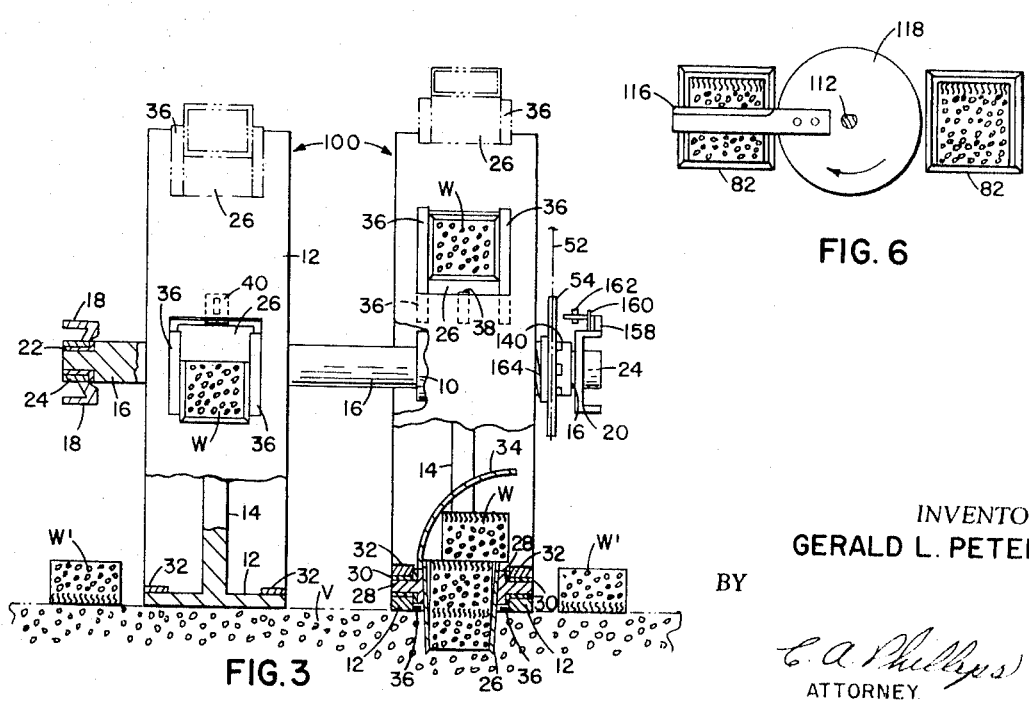
FIG. 6
FIG. 3
INVENTOR.
GERALD L. PETERS.
BY
C. A. Phillips
ATTORNEY

SOIL TREATING MACHINE

In the development and maintenance of lawns, golf courses, playgrounds, and like grassy areas, two fundamental risks are associated with the present most common means—seeding and sprigging—of establishing lawn grass type turf. One fundamental risk pertains to excessive rainfall during the seed germination and seed rooting cycle or the sprig rooting cycle which, in general, will cause washed out areas in the top soil which had to be cultivated or loosened in order to receive the seed or sprigs. The second fundamental risk pertains to insufficient rainfall or inadequate applications of water during the seed germination and seed rooting cycle or the sprig rooting cycle which, in general, results in the seedling or sprig being killed. The above risks become more pronounced with certain better grass seeds which are slow to germinate and with certain better grass sprigs which are slow to root and otherwise develop. Complete sodding of areas with the desired lawn grass sod essentially eliminates the above risks; however, the high cost of this method has limited its application to date. The intermittent planting of mature segments or plugs of lawn grass turf, commonly called "plugging," also eliminates the above risks since cultivation or loosening of the top soil is not required and the plugs are resistant to drought conditions since the soil that surrounds the bulk of the grass roots is undisturbed. If cultivation of the soil is required for other reasons, the above risks can be reduced by initially planting annual grass seed, which develops relatively fast, and subsequently planting plugs of the desired lawn grass turf in the same areas. Where undesirable grasses or weeds are well established, they can be chemically killed—thereby avoiding cultivation or loosening of the top soil—prior to planting plugs of the desired grass. The dead roots and foliage of the undesirable growths will, in general, retain the soil until the desirable turf develops.

Despite the advantages associated with the development of desired lawn grass type turf by the planting of plugs of the desired grass, this method is in limited use today primarily, I believe, because of the pronounced amount of manual labor involved.

This invention pertains to a soil treating machine and has as its primary object the provision of new and novel means for the rapid and efficient planting of lawn type grass sod plugs in the soil or sod.

It is a further object of the invention to provide a soil coring apparatus for forming voids in the ground suitable for receiving sod plugs without further preparation of the soil being so treated.

It is a further object of the invention to provide a soil treating machine that does not require cultivation or loosening of the soil or sod area to be treated.

It is another object of the invention to provide a machine of the class described with a means for utilizing strips or slices of commercially available slabs of desirable lawn type grass sod as the source of the sod plugs to be planted.

It is also an object of the invention to provide a machine of the class described which is of simple and durable construction and can be simply and efficiently operated.

Other objects of the invention are: to provide a machine of the class described which is suitable for manual operation (as could be employed for plugging golf course green type areas); to provide a machine of the class described suitable for use with a tractor preferably equipped with a hydraulic lift or actuator mechanism arranged to permit raising and lowering of the forward wheels and/or the entire plugging machine at the option of the tractor operator; and to provide a machine of the class described which is suitable for self-propelled operation.

Another object of the invention is to provide a machine of the class described which is self-actuating upon being pushed or drawn by ordinary conventional means.

Another object of the invention is to provide a machine of the class described adapted for planting a multiplicity of rows of sod plugs as the machine makes a single pass over the soil or sod area being treated.

Other and further objects, advantages and features of this invention are those inherent in the apparatus herein illustrated and described as an example of one embodiment of this invention.

In the accompanying drawings in which corresponding numerals refer to like parts the views are as follows:

FIG. 3 is a partial front elevation view partly broken away and partly in section.

FIG. 5 is a partial view of a soil or sod plug extracting wheel and illustrates the motion of a sod bucket during the soil cutting or coring and extraction process as the machine traverses the area being treated.

FIG. 6 is a partial sectional view on the line 6-6 of FIG. 2.

Figure 1:
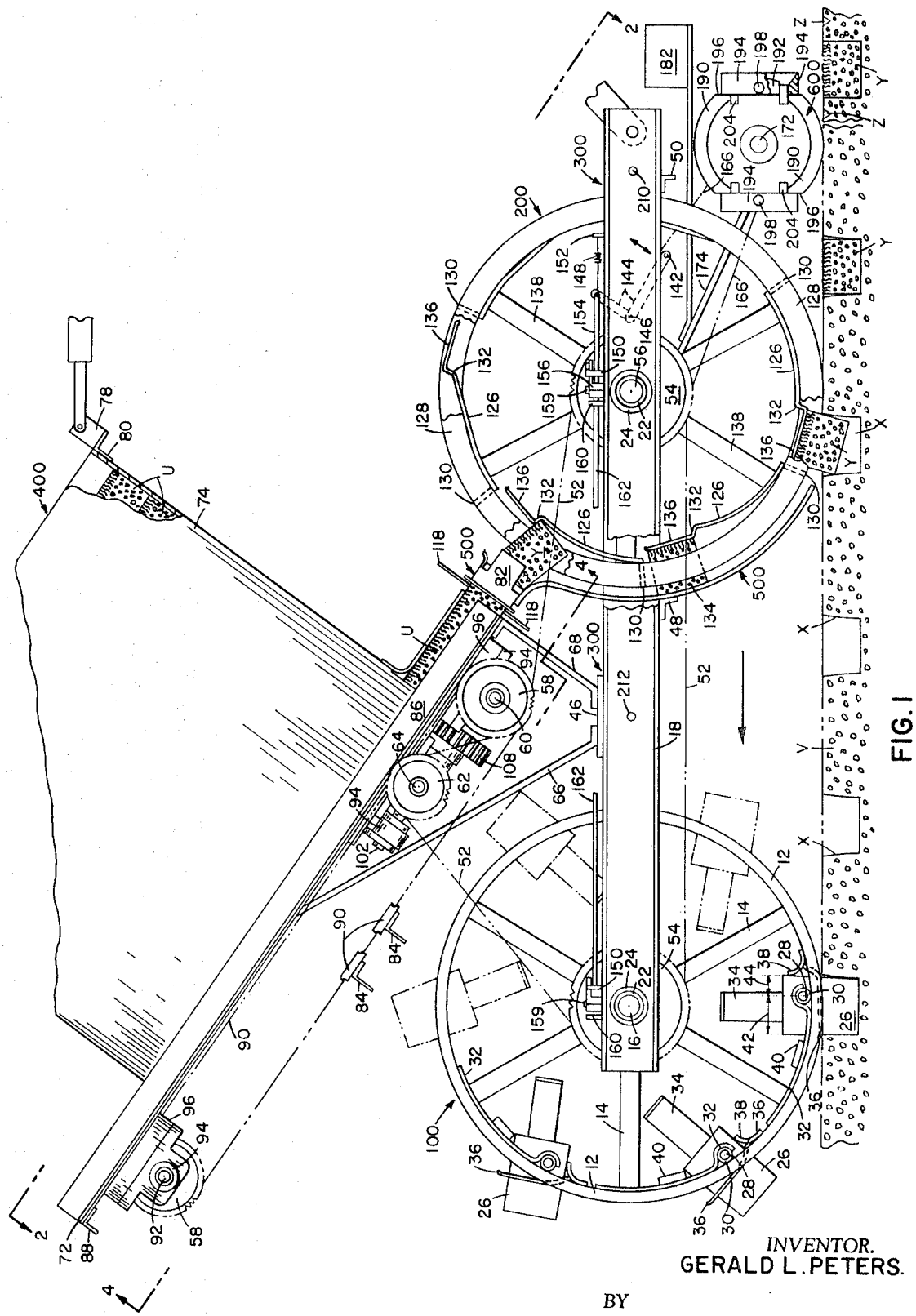
FIG. 1 is a partly broken away left side elevational view of a soil treating machine for planting sod plugs which incorporates features of this invention.
Figure 4:
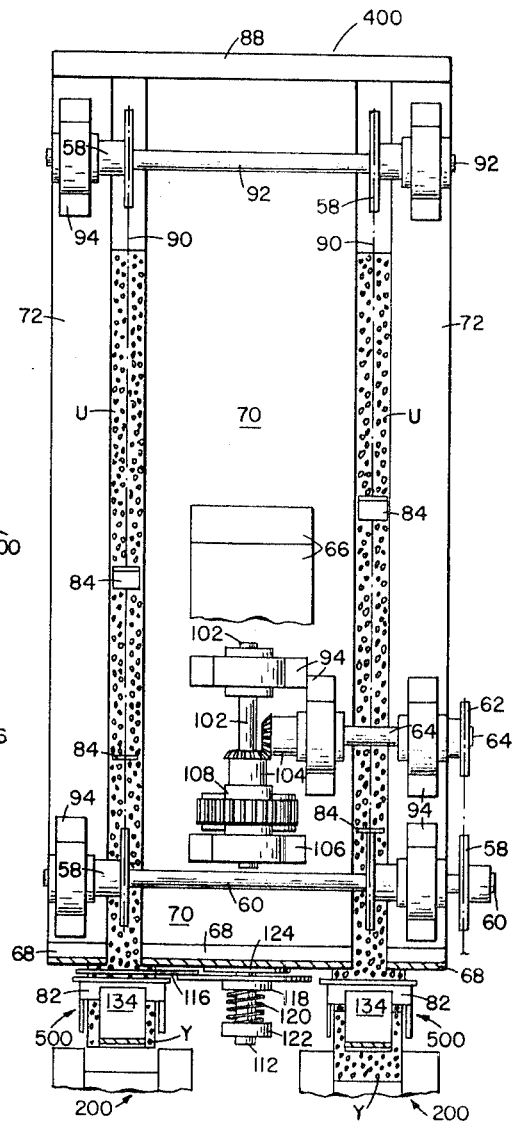
FIG. 4 is a sectional view partly broken away on the line 4-4 of FIG. 1.

Referring to the drawings, particularly to FIGS. 1—4, the soil coring or plug extracting wheels generally designated 100 are comprised of a hub 10 which is connected to the ground-engaging rim 12 by the spokes 14. For clarity the wheel 100 in the background is not shown in FIG. 1; however, FIG. 4 illustrates how adjacent plug extracting wheels 100 are staggered with respect to each other. The wheels 100 are indexed on and rigidly attached by conventional means to the shaft 16 which is journaled to the frame members 18 and 20 by the bearings 22 and the bearing housings 24, the housings 24 being welded to the frame members 18 and 20. As illustrated in FIGS. 1 and 4, in the rim 12 of wheels 100 there are provided elongated apertures through which rectangular plug extracting buckets 26 project and are unrestrained by the apertures during operation except insofar as the width of the apertures prevents any significant sideways (perpendicular to the path of the machine) movement of the buckets 26 by so restraining the flanged bearings 30 as illustrated in FIG. 4. The width of the apertures are all identical and the sides of the apertures of each wheel are located on two parallel planes perpendicular to the axis of rotation of the shaft 16 thereby maintaining the same lateral location of all buckets on an individual wheel. The plug extracting buckets 26 are identical and located at uniformly spaced intervals around wheel 100. The rectangular shaped buckets or tubes are tapered inward on all sides from the discharge end toward the cutting edges of all sides of the opposite or digging and filling end thereby making easy the passage of the plugs W (extracted from the soil) through the bucket and also resulting in a void X in the soil which is tapered toward the bottom and consequently suitable for subsequent acceptance of the desired sod plug Y despite nominal dimensional and alignment variations within the planting machine; that is, the dimensions of the rectangle formed by the mouth of the void X are of greater magnitude than the dimensions of the sides of the desired sod plugs Y which are not tapered.

The bucket shafts 28 are welded to the sides of the buckets and journaled to the rim 12 by bearings 30 which are held firmly in place by identical leaf springs 32 that are rigidly bolted, on the ends opposite the ends which partially encircle the bearings 30, to the rim 12. The uniform spacing of buckets 26 around the rim 12 and the axis of rotation of bucket shafts 28, which is parallel to the axis of rotation of shaft 16, are maintained fixed with respect to the rim 12 by the leaf springs 32. Upon the buckets experiencing abnormal loads, as could be caused by contacting hard objects in the soil during the plug cutting and extraction process, springs 32 will yieldably permit motion of the buckets 26 generally toward the center of the wheel 100 thereby avoiding significant damage to the buckets or preventing upset of the machine. After passing over any objects causing excessive loads the buckets are automatically returned and maintained in the operating positions previously described by the resilient action of the springs 32.

The extracted plug W deflectors designated 34 are identical and are employed to expel the extracted plugs W' beyond the path of the plug planting wheels generally designated 200. As illustrated, the deflectors are curved metal strips spot welded to buckets 26.

Leaf springs 36 are employed as a resilient method for firmly depressing the soil V in the immediate areas beyond the sides of buckets 26 as the buckets begin to be extracted from the soil V as a wheel 100 rolls on the soil or sod being treated. This action prevents the development of plug voids X in the soil V with irregular or broken-away edges. Leaf springs 36 are bolted to the rim 12 along the inside diameter thereof or could be attached directly to buckets 26. Leaf springs 38 which are bolted to the inside of rim 12 are employed to resiliently urge buckets 26 to rotate around the axis of shafts 28 to a position against stops 40 when the buckets are not engaged with the sod or soil V. The bucket stops 40 provide positioning means for the buckets or tubes and are employed to uniformly control the angle at which the individual buckets 26 enter the soil or sod V as the machine moves in a forwardly direction. The stops 40 are equipped with elongated holes thru which the bolts pass that secure the stops to the rim 12. Limited adjustment of the stops, as may be required for typical local variations of soil or sod conditions, is accomplished by loosening of the bolts that secure stops 40 to rim 12 and sliding the stops along the inside surface of the rim in a direction that results in increasing or decreasing the soil or sod entry angle of buckets 26. The bolts are retightened individually after the desired bucket entry angles, which are the same for all buckets on the wheels 100, are established individually by adjustment of the stops as described. The desired bucket entry angle is determined by trail soil or sod plug extraction operations, with various bucket entry angles, over an area representative of the average soil or sod condition of the area to be plugged. The bucket entry angle that produces the most uniformly developed soil or sod plug cavity X is selected by visual observations. For the configuration illustrated; pronounced variations of the soil or sod conditions, as may be encountered from one geographical area to another, are compensated for by varying the dimensions 42 and 44 of FIG. 1 and thereby (for the configuration illustrated) controlling the unbalanced torque exerted on buckets 26 during plug W cutting or coring process. The unbalanced torque on the buckets 26 being a function of the length of the dimension 44 with respect to the length of the dimension 42. FIG. 5 illustrates the action of an individual bucket 26 during the plug cutting and extraction process as the machine moves over the soil or sod area being treated. Line T represents the path of the axis of rotation of the shafts 28 and the bucket entry position is represented by solid lines whereas subsequent positions of the bucket, as the wheel 100 rolls in the direction of the arrow S, are represented by broken lines. For clarity, only the outlines of the progressive positions of a bucket 26 are shown with the broken lines.

The main frame 300 of the machine illustrated is comprised of the aforementioned side members 18 and 20 in conjunction with cross members 46, 48 and 50 which collectively maintain a fixed relationship between the core extraction wheels 100, the plug planting wheels 200, the desired sod plug feeder assembly generally designated 400, and the desired sod plug guide and retainer assembly generally designated 500. Synchronism between the core extracting wheels 100, the plug planting wheels 200, and the elements of the feeder assembly 400 is maintained by continuous chain 52 in conjunction with sprocket 54 rotatably mounted on plug extraction wheel shaft 16, sprocket 54 rotatably mounted on the plug planting wheel shaft 56, sprocket 58 rigidly mounted on the desired sod strip conveyor drive shaft 60, and sprocket 62 rigidly attached to the desired sod plug cutter drive shaft 64. The power required to maintain the synchronism of the above elements is derived from the penetration of buckets 26 into sod or soil V which forces wheels 100 to rotate as the machine is forced to traverse the area being treated.

Figure 2:
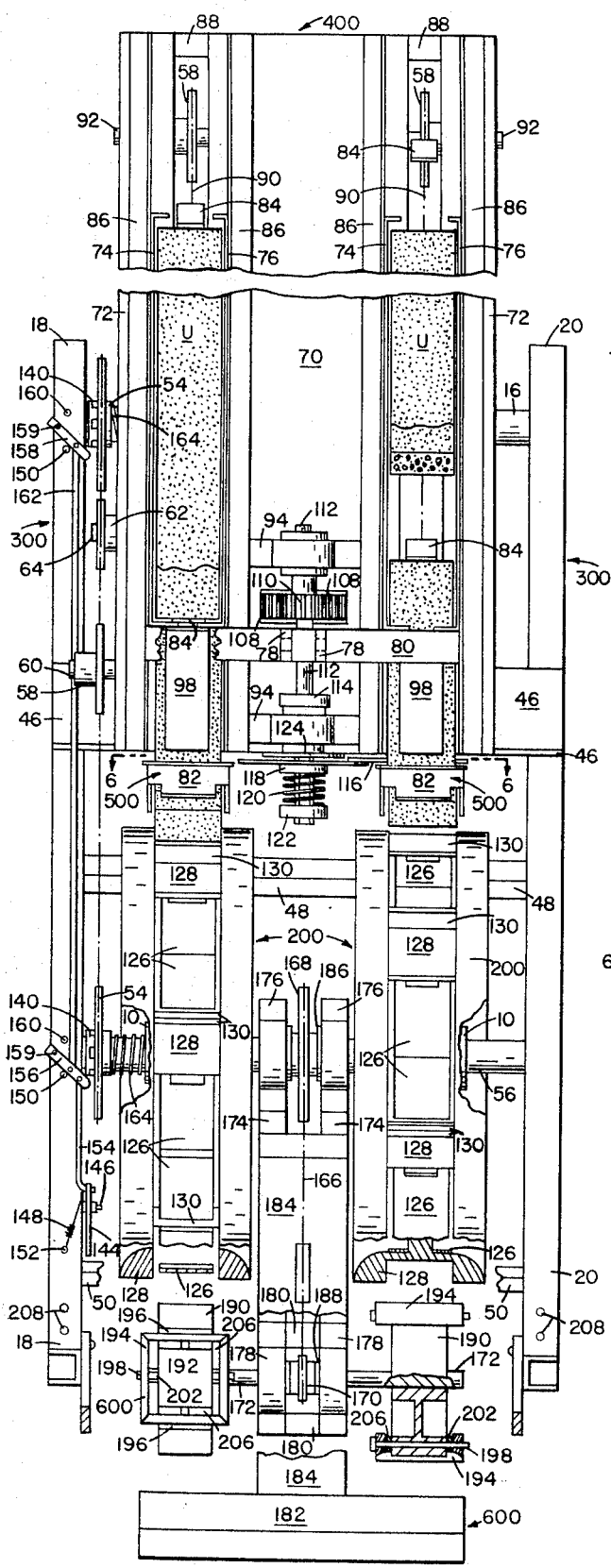
FIG. 2 is essentially a plan view on the line 2-2 in FIG. 1 except that the sod plug crimping and depressing wheels have been rotated as an unit to an orientation permitting maximum illustration.

The illustrated configuration of the desired sod plug feeder assembly 400 is best described by referring to FIGS. 1, 2 and 4. Supporting members 66 and 68 are rigidly attached to the mainframe cross member 46 and at the opposite ends member 68 is rigidly attached to feeder base plates 70 and 72 and support member 66 is rigidly attached to base plate 70. Desired sod strip storage bin side-plates 74 and 76 maintain the stacked condition of the sod strips U and serve to transmit the actuator (partially shown) loads to and thru the machine from the actuator attaching plates 78 and the actuator attachment support member 80. An aperture is provided between the side-plates 74 and 76 at the rearward facing ends thereof to permit visual determination of the remaining sod strips U and this gap is enlarged at the base of the plates to permit free passage of the bottom sod strip in a direction toward the sod plug guide 82. An aperture is provided between the forward ends of the bin side-plates 74 and 76 to permit fast and efficient manual loading of the sod strips U and this gap is enlarged at the base of the plates to permit the first loaded sod strip in each bin to project in a forwardly direction thru the enlarged aperture as required for proper orientation with respect to sod strip U conveyor chain attachments 84. The preferred location of the attachments 84 for the sod strip U loading operation is shown in FIG. 2, (although the figure does not otherwise reflect the initial loaded condition) thus the first loaded sod strip in the right hand (as viewed from the rear) bin would project thru the enlarged aperture at the base of the forward end of the bin to a point immediately aft of conveyor chain attachment 84 shown in this area. The bin side-plates 74 and 76 are maintained in position by being rigidly attached to angles 86 which are rigidly attached to the feeder base plates 70 and 72. Cross member 88 in conjunction with the aforementioned support member 68 maintains the illustrated relationship between the feeder base plates 70 and 72. The continuous conveyor chains 90 are driven by sprockets 58 that are rigidly attached to the sod strip conveyor drive shaft 60 and are equipped with equally spaced conveyor chain attachments 84 at discrete intervals essentially equal to the length of desired sod strips U. Conveyor chain 90 idler sprockets 58 are attached to the conveyor chain idler sprocket shaft 92 which like the sod strip conveyor drive shaft 60, is journaled to feeder base plates 72 by bearings 94. As the machine traverses the area being treated conveyor chain attachments 84 project thru and move along the apertures formed by the voids in between the feeder base plates 70 and 72 and thereby consecutively engage and drive sod strips U thru the aperture at the rearward base of the sod strip bin in a direction toward the sod plug guides 82. Bearing spacers 96 are employed to establish and maintain a uniform spacing between shafts 60 and 92 and base-plates 72. Sod strips U are gravity fed onto the base plates 70 and 72 of feeder assembly 400. Base plates 70 and 72, angles 86, and sod strip guide plates 98 jointly maintain the direction of the sod strips after they pass thru the last noted apertures.

The aforementioned sod plug cutter drive shaft 64 is journaled to feeder base plates 70 and 72 by bearings 94 and drives gear shaft 102, thru the rigidly shaft mounted level gears 104, which is journaled to base plate 70 by bearings 94 and 106 and on which spur gear 108 is rigidly mounted. Spur gear 108 drives spur gear 110 which is rigidly mounted on the rotary knife drive shaft 112 which is journaled to baseplate 70 by bearings 94. Shafts 64 and 102 are restrained from movement along their axes of rotation by the aforementioned elements rigidly mounted thereon in conjunction with the aforementioned bearings. Shaft 112 is likewise restrained by the presence of the rigidly mounted collar 114 in conjunction with spur gear 110 and the bearings 94. The single knife blade 116, which is rigidly attached to housing 118, rotates as the machine moves over the area being treated. A flat area within the bore of the housing 118 and a like flat area on the shaft 112 causes the knife housing to rotate with the said shaft. A slip-fit between the housing 118 and the shaft 112 in conjunction with the resilient action of the spring 120 permits movement, in the direction of shaft 112 toward collar 122, of the knife blade 116 and the housing 118 while the knife blade is in contact with and in the process of slicing a plug Y from the sod strips U. Rapid return of housing 118, to a position against the washer-type thrust bearing 124, occurs after the plug slicing operation is completed. Collar 122 is rigidly attached to shaft 112.

The features and functions of the sod plug guide and retainer assembly 500 and sod plug planting wheel 200 are described by referring particularly to FIG. 1. Sod plug guide 82 is flared at the rectangular entrance for the sod strips U so as to allow for nominal misalignment between feeder assembly 400 and guide and retainer assembly 500 without affecting the proper operation of the machine. As the machine traverses the area being treated, sod strips U are continuously fed to and thru the guides 82 from the feeder assembly 500. As previously noted, the motion of the conveyor attachments (and thus the motion of the sod strips being fed into the guides 82) and the knife blade 116 is maintained in register with the rotation of the wheels 100 and 200. After the sod strip U projects thru (toward wheel 200) the aperture in guide 82 to the required length, blade 116 rotates across the path of the sod strip in between feeder assembly 400 and guide and retainer assembly 500 and thereby cuts sod plugs Y from sod strips U. As previously noted, blade 116 travels with the sod strip U toward guide 82 during the cutting process—the aperture between feeder assembly 400 and guide 82 is so sized as to permit this blade motion without an interference. Blade 116 alternately cuts sod plugs Y from the sod strip in guide 82 on the right side of the machine and then (one-half revolution later) cuts a plug from the strip in the guide 82 on the left side of the machine.

After being cut to length by blade 116, sod plugs Y are pushed by the continuous motion of sod strips U thru guides 82 and against the resilient sod plug seat 126 of planting wheel assembly 200. Sod plug seat 126 is bolted to the rim 128 by bolts that project thru holes provided in the rim and are in fixed engagement with threads provided in sod plug rim stops 130. Sod plug seats 126 yieldably permit sod plugs Y to extend thru apertures provided in rim 128. As wheel 200 continues to rotate, sod plug Y is rotated generally perpendicular to its previous path as a result of being in simultaneous engagement with sod plug seat 126, sod plug seat stop 132, and that part of sod plug retainer 134 in the immediate area of guide 82. Continued rotation of wheel 200 results in the sod plug coming to rest against sod plug rim stop 130 and in the plug being resiliently held against sod plug retainer 134 by sod plug seat 136. Sod plug rim stops 130 are equally spaced around rim 128 to maintain proper registry with sod plug cavities or voids X formed by wheel 100. The sides of the sod plug apertures provided in rim 128 are contained in parallel planes perpendicular to the axis of rotation of shaft 56 to which wheels 200 are indexed and rigidly attached. The sides of sod plug apertures in rim 128 are employed to insure lateral alignment of sod plugs Y with cavities X. Sod plug Y is maintained in position against sod plug retainer 134, which is rigidly attached to mainframe crossmember 48, until continued rotation of the wheel 200 results in plug Y coming in register with a sod plug cavity X as plug Y passes beyond the end of retainer 134—subsequent rotation of wheel 200 causes plug Y to be forced into cavity X by the tendency of sod plug seat 136 to return to its original free position plus the rolling action of wheel 200. Spokes 138 are employed to rigidly maintain a fixed relationship between the rim 128 and hub 10 of plug planting wheel assembly 200.

FIGS. 1, 2 and 3 illustrate the clutch mechanism provided for simultaneously disengaging sprockets 54 from driving contact with clutch plates 140 that are rigidly attached to plug cutting and extraction wheel shaft 16 and the plug planting wheel shaft 56. A push-pull rod (not shown) pivotally attached at hole 142 permits the option of engaging or disengaging sprockets 54 with clutch plates 140 to be exercised from a location remote from the machine. Disengagement of the sprockets from the clutch plates and raising of the forward part of the machine (so that wheels 100 do not contact the surface over which the machine is being moved) is normally required during periods of maneuvering or transporting operations. Clutch lever 144 is pivotally mounted on stud 146 and held in the normal machine operating position (as illustrated) by the resilient action of the spring 148, sprocket actuator "engaged-position" stops 150, spring attachment stud 152, and actuation rod 154. Disengagement of sprockets 54 from plates 140 is accomplished by rotation of clutch lever 144 in a counterclockwise direction (as viewed in FIG. 1) to a position where sprocket actuators 156 and 158 that rotate about studs 159 are in contact with the "disengaged-position" stops 160. The force required to actuate the forward clutch assembly is transmitted by actuation rod 162. This "disengaged-position" of the sprockets is maintained by actuators 156 and 158 which remain in contact with sprockets 54 and "disengaged-position" stops 160 as a result of the resilient action of springs 164 which yieldably permitted the movement of sprockets 54 along shafts 16 and 56. The recesses on clutch plates 140, which engage the projections on the hubs of sprockets 54, are identical and uniformly spaced to maintain the proper registry of plug extraction wheels 100 and plug planting wheels 200 when the sprockets and plates are in driving contact.

Referring to FIGS. 1 and 2, the sod plug depressor and crimper wheel assembly generally designated 600 is described as follows. Registry with planting wheels 200 is maintained by continuous chain 166 which engages sprockets 168 and 170 that are indexed on and rigidly attached to shafts 56 and 172, respectively. The frame of depressor-crimper assembly 600 is comprised of: the two longitudinal members 174 that are journaled to shafts 56 and 172 by bearings 176 and 178, respectively; cross members 180 that are bolted to the longitudinal members; and dead weight 182 support member 184. Longitudinal members 174 maintain the spacing and parallelism between shafts 56 and 172. Cross members 180 in conjunction with dead weight support member 184 (which is also bolted to longitudinal members 174) maintain the proper lateral position of depressor-crimper assembly 600 with respect to planting wheel 200 by establishing and maintaining a contact between sprockets 168 and 170, washer type thrust bearings 186 and 188, and bearings 176 and 178 (this contact condition is illustrated in FIG. 2). Plug depressor wheels 190 are indexed on and rigidly mounted to the shaft 172 so as to roll over the sod plugs Y planted in voids X by the planting wheels 200. The rim area of wheel 190 designated 192 further depresses sod plugs Y into sod or soil plug cavities X and rectangular sod or soil crimping elements 194 are provided to crimp the sod or soil V toward plug Y on all sides of plug Y as the machine traverses the area being treated. Crimping voids Z remain around the perimeter of the planted plugs Y after the depressor-crimper assembly passes over the planted plugs. Machined surfaces 196 are provided for maintaining the orientation of crimper elements 194 that are attached to wheels 190 by pins 198. Spacers 202 and cast or machined voids 204 in wheel 190 establish aperture 206 to prevent clogging of this area with sod or soil. Dead weight 182 in conjunction with the dead weight support member 184 provide a downward force for the plug depressing and crimping operation.

Holes 208 are shown in frame members 18 and 20 to illustrate where a member supporting an engine for self-propelling this machine and handlebars may be mounted.

Holes 210 and 212 are provided in frame members 18 and 20 to illustrate alternate points for attachment of linkages for coupling this machine to a farm tractor type implement.

This invention can be embodied in many forms without departing from the spirit or essential characteristics thereof. The illustrated embodiment is, therefore, not to be considered as restrictive in any respect, the scope of the invention being indicated by the appended claims rather than by the foregoing description of a specific embodiment, and all changes which come within the meaning and range of equivalency of the claims are, therefore, intended to be embraced therein.

What I claim is:
1. A soil treating machine comprising:
A. A frame member
B. A wheel rotatably mounted on said frame member for rotation in a first direction;
C. A plurality of coring tubes for extracting cores of soil, each said coring tube being open at both ends and tapered at one end, a digging and filling end, being smaller than the other end, a soil core discharge end;
D. Mounting means for rotatably mounting said tubes spaced about the periphery of said wheel with said digging and filling end outward of the periphery of said wheel, each tube being so mounted on an axis which is:
 1. parallel to the axis of said wheel
 2. substantially perpendicular to the tubular axis of each said tube, and
 3. offset from said tubular axis in a direction corresponding to said first direction of rotation of said wheel, and
E. Tube positioning means supported by said wheel comprising:
 1. limit means supported by said wheel for limiting the angular travel of each said tube about said axis on which it is mounted, and establishing the initial entry angle of each said tube into the soil.
 2. Spring means supported by said wheel for resiliently maintaining said tubes in engagement with said limit means;
whereby the position of the tubular axis of each said tube is variable with a fixed limit provided by said limit means, and voids in earth are obtained which are equally spaced and have a minimum taper as said wheel is rotated in said first direction.

2. The soil treating machine set forth in claim 1 further comprising soil holding means supported by said wheel for yieldably engaging soil around a substantial portion of the periphery of each said tube and holding peripheral soil in place as a said tube removes a core of soil from the ground.

3. The soil treating machine as set forth in claim 1 further comprising:
A. Sod planting means for receiving plugs of sod of the same configuration as said cores of soil and injecting said plugs of sod into voids created by the removal of said cores of soil; and
B. coupling means operatively connected to said first wheel and said sod planting means for controlling the position of injection of said plugs of sod in register with the said voids created by the removal of said cores of soil by said coring tubes.

4. A soil treating machine as set forth in claim 3 wherein said sod planting means comprises:
A. A second wheel rotatably mounted on said frame;
B. Sod holding receptacles of like circumferential spacing as said tubes on said first wheel and being positioned about the periphery of said second wheel and including sod ejection means for applying an ejection force to sod held in said holding receptacles; and
C. Guide means generally concentric with and outwardly spaced from said second wheel for maintaining sod in said receptacles until a sod filled receptacle reaches a position over a said void in the soil permitting a said plug of sod to be ejected from a said receptacle into a said void.

5. A soil treating machine as set forth in claim 4 wherein said sod holding receptacles coacting with said guide means comprise sod receiving means for individually receiving a plurality of said plugs of sod in a continuous flow and positioning each said plug in a said receptacle as said second wheel turns.

6. The soil treating machine set forth in claim 5 further comprising plug depressing means including a third wheel mounted on said frame member and separated from said first wheel by said second wheel and being of a width and position to depress said plugs of sod as said soil treating machine is moved in a forward operating direction.

7. The soil treating machine set forth in claim 10 wherein said plug depressing means comprises:
A. Coupling means operatively connecting said second wheel and said third wheel for maintaining register between said second wheel and third wheel whereby the position of depression applied by said depression means is accurately maintained; and
B. A plurality of crimping frames, each generally corresponding to the configuration of a said plug of sod and mounted on the periphery of said third wheel; and
C. The diameter of said third wheel and the number and position of said crimping frames being arranged to apply a compression of soil around the edges of each planted core of sod as said machine traverses the area being treated.